US PATENT 3,219,674
Patented Nov. 23, 1965

3,219,674
15-DEHYDRO-16 METHYL STEROIDS AND PROCESS FOR THE PRODUCTION THEREOF
Octavio Mancera, Howard J. Ringold, and Carl Djerassi, all of Mexico City, Mexico, assignors, by mesne assignments, to Syntex Corporation, a corporation of Panama
No Drawing. Filed Feb. 24, 1960, Ser. No. 10,553
Claims priority, application Mexico, Mar. 11, 1959, 53,927; May 6, 1959, 54,480
22 Claims. (Cl. 260—397.4)

The present invention relates to a new process for the production of certain cyclopentanophenanthrene derivatives.

More particularly, it relates to the production of 16α-methyl-17α-hydroxy-20-keto-pregnanes, which compounds are valuable intermediates in the manufacture of the important steroidal 16α-methyl-hormones by methods which have been described in the literature.

The hitherto used processes for preparing the 16α-methyl-17α-hydroxy-20-keto-pregnanes involve the hydroxylation of a 16α-methyl-20-keto compound at C–17α by the method of Gallagher. This well known method comprises the formation of the 20-enol acetate, the subsequent epoxidation of the double bond between C–17 and C–20 of the enolized compound by treatment with a peracid, and finally an alkaline treatment in order to obtain the 17α-hydroxy-20-keto compound; however, in the presence of a methyl group at C–16 and also in the presence of double bonds at C–9, 11 and/or at C–5, 6, which are susceptible to oxidation by the peracid, this method suffers from the drawback of rendering only unsatisfactory yields.

We have now made the surprising discovery that the easily accessible 16β-methyl-16α,17α-oxido-20-keto-pregnanes can be converted to the respective 16α-methyl-17α-hydroxy-20-keto-pregnanes by the novel process according to the invention, which comprises, as an essential feature, the process steps illustrated by the following reaction sequence:

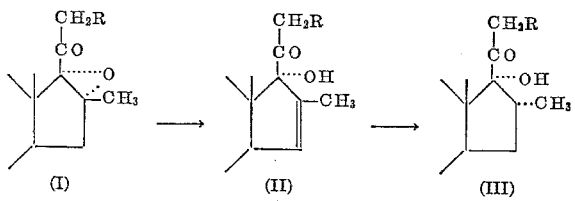

wherein R is a member of the group consisting of hydrogen, the hydroxyl group, and the acyloxyl radical of a hydrocarbon carboxylic acid having up to 12 carbon atoms and being saturated or unsaturated, of straight or branched chain, cyclic or mixed cyclic aliphatic, unsubstituted or substituted with methoxy, halogen or other groups.

This process for producing 16α-methyl-17α-hydroxy-20-keto-pregnanes according to the invention thus comprises reacting a 16β-methyl-16α,17α-oxido-20-keto pregnane derivative (I) with a hydrogen halide in an inert organic solvent so as to obtain the corresponding 16-methyl-Δ$^{15}$-17α-hydroxy-20-keto-pregnane derivative (II), and reacting the latter with hydrogen in the presence of a hydrogenation catalyst so as to obtain the corresponding 16α - methyl - 17α - hydroxy - 20-keto-pregnane derivative (III).

The term "hydrogen halide" refers to preferably the saturated aqueous solutions thereof, for instance hydrochloric acid having a concentration of from 33 to 37% by weight HCl.

The hydrogen halide can also be applied in the form of a tertiary amine hydrohalide, whereby the hydrogen halide is set free in situ from the complex organic salt during the reaction.

Although in general the reaction of 16β-methyl-16α, 17α-oxido-compound with a hydrogen halide gives rise to the formation of halohydrine, we have discovered that under the conditions outlined in more detail further below, this reaction leads to the unsaturated 16-methyl-Δ$^{15}$-compound represented by Formula II.

We prefer to treat the starting compound with concentrated hydrochloric or hydrobromic acid in certain oxygen containing organic solvents among which there are acetone, methyl-ethyl ketone, dioxane and similar compounds at a temperature in the range from below —10° C. to room temperature. The preferred solvent is acetone and the preferred temperature range 0° to 10° C.

When using the hydrohalide of a tertiary amine such as pyridine hydrobromide, pyridine hydrochloride, collidine hydrobromide, collidine hydrochloride, or the like, the above treatment of the starting compound is carried out in a lower aliphatic alcohol such as ethanol or methanol as the solvent, and at a temperature ranging from room temperature to the reflux temperature.

We assume that during the above described treatment with hydrogen bromide, there is formed an intermediate 16-methyl-16,17-bromohydrin which spontaneously dehydrobrominates to give the unsaturated Compound II.

The intermediate II is in turn hydrogenated to Compound III, preferably in an alcoholic solution, for instance in methanol, and in the presence of a palladium on charcoal catalyst.

The fact that the hydrogenation proceeds from the same side of the steric configuration of the angular methyl group at C–10, that is, from the β-side, and thus gives rise to the methyl group at C–16 in the α-position, is another surprising feature in the process according to our invention. For it was to be expected that the hydrogenation would take place from the "α" side resulting in the formation of the 16β-methyl compound. It is further noteworthy that the hydrogenation does not cause the loss of the 17α-hydroxyl group in spite of the fact that this group is activated by the proximity of the keto group at C–20 and by being an allylic hydroxyl group.

The hydrogenation of intermediate II to Compound III is also effected in the presence of a nickel catalyst and the methanol solvent in the hydrogenation step may be replaced by another solvent, such as ethyl acetate, but always the hydrogenation is interrupted after the uptake of 1 molar equivalent of hydrogen.

The starting compound for the process according to the invention is selected from the group consisting of the compounds of the general formulas:

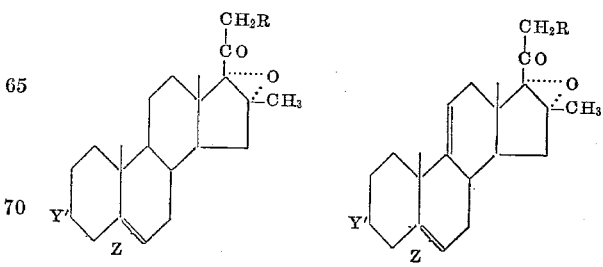

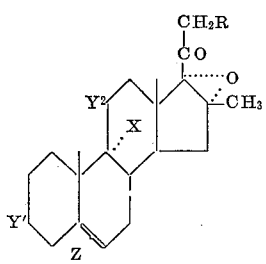

wherein R is selected from the group consisting of hydrogen, hydroxy and acyloxy; X is selected from the group consisting of hydrogen and fluorine; Y' is selected from the group consisting of =O, α-hydroxy, β-hydroxy, α-acyloxy and β-acyloxy; $Y^2$ is selected from the group consisting of =O, α-hydroxy, β-hydroxy and α-acyloxy; when Y' is =O, Z is selected from the group consisting of a single bond between C-5 and C-6 with the hydrogen attached to C-5 in α-position and such single bond between C-5 and C-6 with the hydrogen attached to C-5 in β-position; when Y' represents a member of the above described group other than =O, Z is selected from the group consisting of a double bond between C-5 and C-6, a single bond between C-5 and C-6 with the hydrogen attached to C-5 in α-position, and a single bond between C-5 and C-6 with the hydrogen attached to C-5 in the β-position; the aforesaid acyloxy and acyl groups being those of a hydrocarbon carboxylic acid having up to 12 carbon atoms.

Those of the above mentioned starting compounds having a free or esterified 3β-hydroxyl group can be obtained from $\Delta^{16}$-20-keto-pregnanes of the formulas

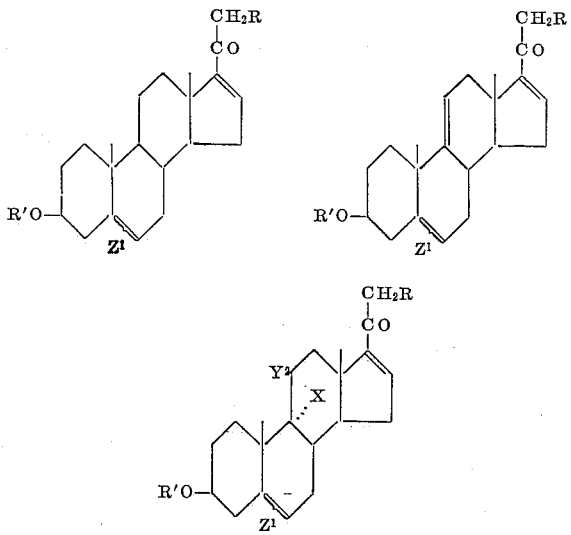

wherein R, X, and $Y^2$ have the same meaning as defined above; $R^1$ is selected from the group consisting of hydrogen and acyl; $Z^1$ is selected from the group consisting of a double bond between C-5 and C-6 and a saturated linkage between C-5 and C-6 with the hydrogen atom at C-5 in α- or β-position. The introduction of the 16β-methyl group and of the 16α,17α-oxido group is effected by reacting the above compounds in a known manner with diazomethane to obtain the corresponding pyrazoline and decomposing the latter by means of the thermal treatment described by Wettstein in Helv. Chim. Acta, XXVII, 1803 (1944) to produce the corresponding 16-methyl-$\Delta^{16}$-20-keto pregnane derivative, and then reacting the latter, for instance, with alkaline hydrogen peroxide so as to obtain the corresponding 16β-methyl-16α,17α-oxido-20-keto pregnane derivative. Since this latter reaction is accompanied by the hydrolysis of ester groups, which may be present at C-3 (R'=acyl), the resulting 3-hydroxy group has to be re-esterified, if desired, by conventional methods. In a specific mode of carrying out the invention, the 3β-hydroxyl group of the compounds having a single bond between C-5 and C-6 is further oxidized to the 3-keto group in the conventional manner with chromic acid to obtain starting materials wherein $Y^1$ equals =O.

The above described conventional reactions leading to the starting material (I) can be carried out at very high yield rates, and the yield rates of the steps comprised in the process according to the invention are equally in the order of 80% and higher.

In contrast thereto the conversion of a $\Delta^{16}$ compound to the corresponding 16α-methyl-17α-hydroxy-compound via a Grignard reaction for introducing the methyl group at C-16 and the Gallagher reaction for introducing the hydroxyl group at C-17α proceeds with only low overall yields.

Another suitable starting material for the process according to the invention is 9α - fluoro - 16 - methyl - 16α, 17α - oxido - pregnan - 11β - ol - 3,20 - dione, which was obtained, for instance, from $\Delta^{16}$-pregnen-3α-ol-11,20-dione, described by Slates et al. in J. Org. Chem., 22, 499 (1957), by the following reaction sequence: the keto group at C-20 was protected by formation of the cycloethyleneketal; the 11-keto group was then reduced to the β-hydroxyl group by reaction with lithium aluminium hydride; upon hydrolysis of the ketal group there was obtained $\Delta^{16}$-pregnene-3α,11β-diol-20-one; by reaction with diazomethane followed by pyrolysis of the resulting pyrazoline there was obtained 16-methyl-$\Delta^{16}$-pregnene-3α,11β-diol-20-one; after acetylation at C-3, the latter compound was dehydrated by reaction with methanesulfonyl chloride in dimethylformamide-pyridine to form the acetate of 16-methyl-$\Delta^{9(11),16}$-pregnadien-3α-ol-20-one. The acetoxy group was hydrolyzed and then oxidized to 16-methyl-$\Delta^{9(11),16}$-pregnadiene-3,20-dione. There was then applied the method of Fried et al. for introducing a halogen atom at C-9α as described in J. Am. Chem. Soc., 79, 1130 (1957), and thus there was obtained 16-methyl-9α-fluoro-$\Delta^{16}$-pregnen-11β-ol-3,20-dione. Its double bond at C-16, 17 was epoxidized by reaction with hydrogen peroxide in alkaline conditions and the resulting 16β-methyl-9α-fluoro-16α,17α-oxido-pregnan-11β-ol-3,20-dione (I) was then submitted to the process of the present invention.

Depending on which of the above-described starting materials have been used there are obtained the aforesaid end products (III) of the following formulas:

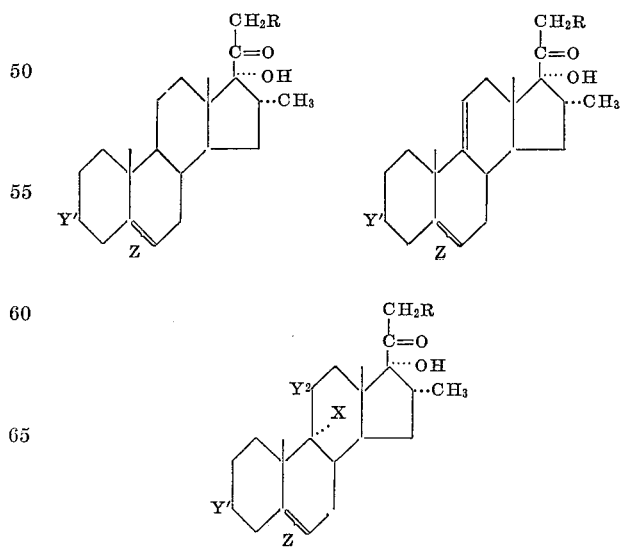

wherein R, X, $Y^1$, $Y^2$ and Z have the above-explained meaning.

However, the method object of the present invention is not limited to the preparation of the aforementioned compounds, but it can be applied for making other similar compounds capable of being converted, as the ones above into 16α-methyl-hormones by known methods.

The use of the end products of the process according to the invention for the production of 16α-methyl-hormones shall be explained, by way of example, at the hand of a process illustrated by the following reaction diagram, in which $Y^2$ and $Z^1$ have the same meaning as explained hereinbefore, and $Z^2$ may represent a double bond between C-4 and C-5 o ra single bond between C-4 and C-5 with the hydrogen attached to C-5 in the α- or β-position:

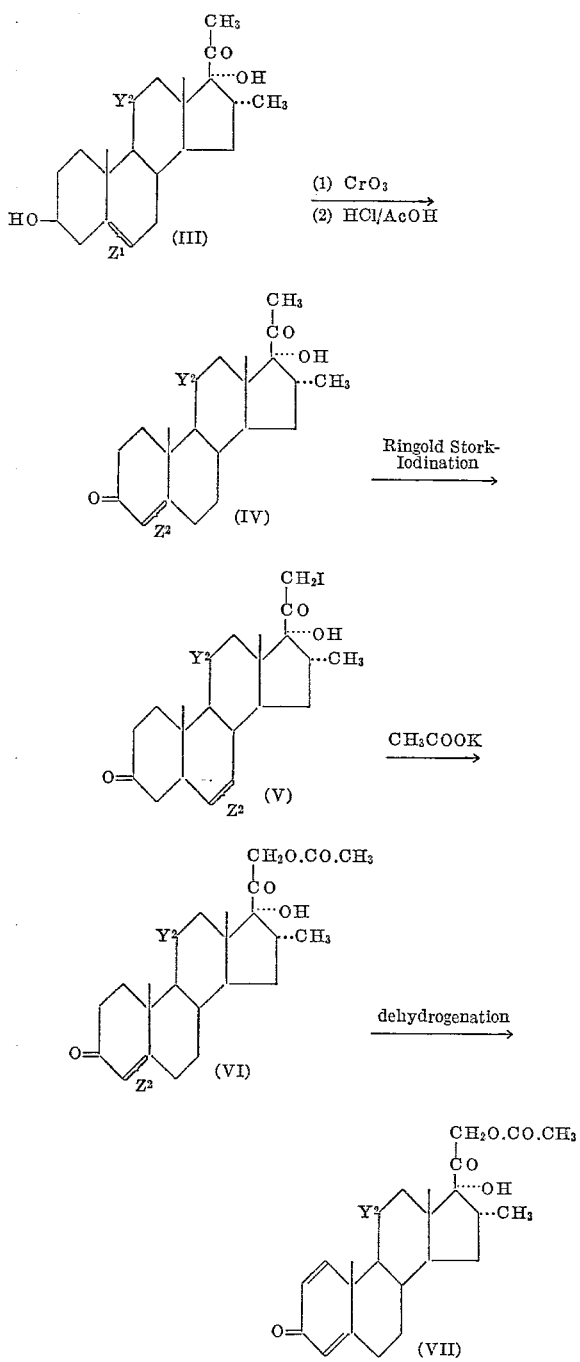

This process comprises the steps of oxidizing the 3-hydroxy group of Compounds III to the 3-keto-group as in Compounds IV, for instance, with chromium trioxide, then a conventional treatment with an acid or base to shift an eventually present Δ⁵-double bond to Δ⁴; introducing iodine at C-21, for instance, by the method of Ringold-Stork supra; acetolysis of the 21-iodo Compounds V to obtain the 16α-methyl derivatives (VI) of, for instance, cortisone or cortexolone (Reichstein's Substance S). Conventional dehydrogenation of the latter with selenium dioxide, or of the corresponding allopregnane derivative (VI, in which Z represents a single bond) via the 2,4-dibromo intermediate yields the Δ¹,⁴-Compounds VII such as, for instance, 16α-methyl-prednisone.

The invention is further illustrated but not limited by the following examples:

*Example 1*

20 cc. of aqueous hydrobromic acid solution of constant boiling point was slowly added to a stirred solution of 5 g. of 16β-methyl-16α,17α-oxido-allopregnan-3β-ol-11, 20-dione in 100 cc. of pure acetone, maintaining the temperature around 10° C. The mixture was stirred for half an hour more at 10° C., diluted with ice water and the precipitate was collected by filtration, dried and recrystallized from acetone-hexane. There was thus obtained 16-methyl - Δ¹⁵ - allopregnene - 3β,17α-diol - 11,20 - dione; M.P. 258–259° C.; $[α]_D$ —64.3° (pyridine).

The above compound was hydrogenated in 400 cc. of methanol, in the persence of a prereduced 5% palladium on charcoal catalyst, at room temperature, until the equivalent of 1 mol of hydrogen had been absorbed, which took a few minutes. The catalyst was removed by filtration, the filtrate was evaporated to dryness under reduced pressure and the residue was purified by chromatography on neutral alumina. There was thus obtained 16α-methyl-allopregnane-3β,17α-diol-11,20-dione; M.P. 254–255° C.; $[α]_D$ +22.0° (pyridine).

The starting material, namely 16β-methyl-16α,17α-oxidoallopregnan-3β-ol-11,20-dione was prepared in the following manner:

A solution of 7 g. of the acetate of Δ¹⁶-allopregnen-3β-ol-11,20-dione, described by Djerassi et al. in J. Am. Chem. Soc., 74, 3634 (1952), in 200 cc. of an ether solution of diazomethane, prepared from 50 g. of nitrosomethyl urea, was kept at room temperature for 24 hours; 5 cc. of acetic acid was then added, the solvent was evaporated under reduced pressure and at room temperature, almost to dryness, and the residue was crystallized from acetone to give the 3-acetoxy-pyrazoline which was decomposed by means of the thermal treatment described by Wettstein (Halv. Chim. Acta, XXVII, 1803 (1944)), by gradually heating to about 180° C. under vacuum. Recrystallization of the crude product from acetone-hexane yielded the acetate of 16-methyl-Δ¹⁶-allopregnen-3β-ol-11,20-dione; M.P. 165–166° C.; $[α]_D$ +25.9° (chloroform); $λ_{max}$ 248–250 mμ, 310–314 mμ, log ε 3.98 and 2.09.

A solution of 5 g. of the above last mentioned compound in 350 cc. of methanol was treated with 20 cc. of a 4 N aqueous solution of sodium hydroxide and immediately afterwards with 20 cc. of 30% hydrogen peroxide, with stirring and maintaining the temperature around 15° C. The mixture was kept overnight in the refrigerator, poured into ice water and the precipitate was collected by filtration, washed with water and dried. Crystallization from acetone-hexane afforded the pure 16β-methyl-16α, 17α-oxido-allopregnan-3β-ol-11,20-dione; M.P. 185–186°; $[α]_D$ +87.3° (chloroform).

*Example 2*

In accordance with the preceding example, the reaction of 16β-methyl-16α,17α-oxido-allopregnan-3β-ol-11,20-dione acetate prepared by acetylation of the free oxide in a conventional manner, with hydrobromic acid afforded the acetate of 16-methyl-Δ¹⁵-allopregnene-3β,17α-diol-11,20-dione. The latter was hydrogenated as described in such example, to form the 3-acetate of 16α-methyl-allopregnane-3β,17α-diol-11,20-dione. By subsequent treatment with 1% potassium hydroxide at room temperature and under an atmosphere of nitrogen there was obtained 16α-methyl - allopregnane - 3β,17α - diol - 11,20 - dione, identical with the final compound of the preceding example.

Example 3

In accordance with the method described in Example 1, 16β - methyl - 16α,17α-oxido - $\Delta^{5,9(11)}$ - pregnadien - 3β-ol-20-one was converted into 16-methyl-$\Delta^{5,9(11),15}$-pregnatriene-3β,17α-diol-20-one and then by hydrogenation of the latter there was obtained 16α-methyl-$\Delta^{5,9(11)}$-pregnadiene-3β,17α-diol-20-one.

The starting material, 16α,17α-oxido-$\Delta^{5,9(11)}$-pregnadien-3β-ol-20-one was obtained by dehydration of $\Delta^{5,16}$-pregnadiene-3β-11α-diol-20-one, described by O. Halpern et al. in J. Am. Chem. Soc., 81, 439 (1959), using the method described by G. Rosenkranz et al. in J. Am. Chem. Soc., 76, 2228 (1954), followed by epoxidation of the 16,17 double bond, in accordance with the method of Example 1.

Example 4

By substituting in the method of the preceding example the 16β-methyl-16α,17α-oxido-$\Delta^{5,9(11)}$-pregnadien-3β-ol-20-one by its acetate there was obtained upon reaction with hydrobromic acid the 3-acetate of 16-methyl-$\Delta^{5,9(11),15}$-pregnatriene-3β,17α-diol-20-one. Hydrogenation of the latter afforded the 3-acetate of 16α-methyl-$\Delta^{5,9(11)}$-pregnadiene-3β,17α-diol-20-one, and finally by alkaline hydrolysis, in accordance with the method of Example 2, there was obtained 16α-methyl-$\Delta^{5,9(11)}$-pregnadiene-3β,17α-diol-20-one.

In accordance with the method of preparation described in Example 1, the compounds listed below under I were converted into the corresponding 16β-methyl-16α,17α-oxides, which by treatment with hydrobromic acid in acetone solution, followed by hydrogenation, by the method described also in Example 1, afforded the corresponding 16α-methyl-17α-hydroxy compounds listed under III via the $\Delta^{15}$-intermediate listed under II.

| Example | I | II |
|---|---|---|
| 5 | $\Delta^{16}$-allopregnen-3β-ol-20-one. Known and conventional. | 16-methyl-$\Delta^{15}$-allopregnene-3β,17α-diol-20-one.<br><br>III<br>16α-methyl-allopregnane-3β,17α-diol-20-one. |
| 6 | $\Delta^{16}$-pregnen-3α-ol-11,20-20-dione acetate. Rosenkranz et al., J. Am. Chem. Soc., 75, 4431 (1953). | 16-methyl-$\Delta^{15}$-pregnene-3α,17α-diol-11,20-dione.<br><br>III<br>16α-methyl-pregnane-3α,17α-diol-11,20-dione. |
| 7 | $\Delta^{9(11),16}$-allopregnadien-3β-ol-20-one 3-acetate. Djerassi et al., J. Org. Chem. 16, 1278 (1951). | 16-methyl-$\Delta^{9(11),15}$-allopregnadiene-3β,17α-diol-20-one.<br><br>III<br>16α-methyl-$\Delta^{9(11)}$-allopregnene-3β,17α-diol-20-one. |
| 8 | $\Delta^{5,16}$-pregnadiene-3β,11α-diol-20-one. O. Halpern et al., J. Am. Chem. Soc. 81, 439 (1959). | 16-methyl-$\Delta^{5,15}$-pregnadiene-3β,11α,17α-triol-20-one.<br><br>III<br>16α-methyl-$\Delta^5$-pregnene-3β,11α,17α-triol-20-one. |

Example 9

A stirred solution of 2 g. of the acetate of 16β-methyl-16α,17α-oxido-$\Delta^5$-pregnen-3β-ol-20-one in 160 cc. of acetone was treated with 8 cc. of an aqueous hydrobromic acid solution of constant boiling point, maintaining the temperature around 5° C. After 15 minutes the reaction mixture was poured into ice water, the precipitate collected by filtration, dried and recrystallized from acetone-hexane; there was thus obtained the acetate of 16-methyl-$\Delta^{5,15}$-pregnadiene-3β,17α-diol-20-one; M.P. 209–211° C.; $[\alpha]_D$ —154.2° (chloroform) in 90% yield.

The above compound was hydrogenated in accordance with the method of Example 1, to afford 16α-methyl-$\Delta^5$-pregnene-3β,17α-diol-20-one 3-acetate; M.P. 202–204°; $[\alpha]_D$ —67° (chloroform).

The starting material 16β-methyl-16α,17α-oxido-$\Delta^5$-pregnen-3β-ol-20-one 3-acetate was obtained from 16β-methyl-$\Delta^{5,16}$-pregnadien-3β-ol-20-one 3-acetate described by Wettstein et al. in Helv. Chim. Acta, XXVII, 1803 (1944), by the epoxidation method described in Example 1.

Example 10

A solution of 12 g. of 16β-methyl-16α,17α-oxido-$\Delta^5$-pregnen-3β-ol-20-one obtained by epoxidation of 16β-methyl-$\Delta^{5,16}$-pregnadien-3β-ol-20-one described by Wettstein et al. in Helv. Chim. Acta, XXVII, 1803 (1944), in 360 cc. of acetone was treated with 35 cc. of concentrated hydrochloric acid (35.5%), maintaining the temperature around 5° C., a precipitate separated almost immediately after the addition of the acid. The mixture was stirred for 30 minutes more at 5° C., the precipitate collected and washed with acetone-water 1:1. There was thus obtained 16-methyl-$\Delta^{5,15}$-pregnadiene-3β,17α-diol-20-one in 85% yield, M.P. 235–245°; after several recrystallizations from acetone-hexane the M.P. was raised to 263–268° C.

Example 11

In accordance with the method of the previous example, 16β-methyl-16α,17α-oxido-allopregnan - 3β - ol-11,20-dione was treated with concentrated hydrochloric acid, but methyl ethyl ketone was used as solvent, instead of acetone; there was obtained 16-methyl-$\Delta^{15}$-allopregnene-3β,17α-diol-11,20-dione, identical with that obtained in Example 1.

Example 12

A solution of 1 g. of 16β-methyl-16α,17α-oxido-$\Delta^5$-pregnen-3β-ol-20-one in 25 cc. of dioxane was treated with 0.25 cc. of concentrated hydrochloric acid and the reaction mixture heated on the steam bath for 20 minutes. It was then poured into ice-water, extracted with methylene chloride, the organic layer washed with 5% sodium carbonate solution and water to neutral, dried over anhydrous sodium sulfate and evaporated to dryness. Chromatography of the crude product on neutral alumina gave 16-methyl-$\Delta^{5,15}$-pregnadiene-3β,17α-diol-20-one in 15–20% yield.

Example 13

A mixture of 3 g. of the acetate of 16β-methyl-16α,17α-oxido-$\Delta^5$-pregnen-3β-ol-20-one, 100 cc. of absolute ethanol and 3 g. of pyridine hydrochloride was refluxed for 3 hours, concentrated under vacuum almost to dryness and the residue was diluted with ice water. The precipitate was collected, washed with water, dried and crystallized from methanol. There was thus obtained the 3-acetate of 16-methyl-$\Delta^{5,15}$-pregnadiene-3β,17α-diol-20-one, identical with the product obtained in Example 9.

Example 14

Example 13 was repeated but using collidine hydrobromide. There was also obtained the 3-acetate of 16-methyl-$\Delta^{5,15}$-pregnadiene-3β,17α-diol-20-one.

Example 15

A solution of 1 g. of the acetate of 16β-methyl-16α,17α-oxido-allopregnan-3β-ol-11,20-dione in 50 cc. of absolute methanol was treated with 1 g. of pyridine hydrochloride and the reaction mixture kept at room temperature for 96 hours. It was then concentrated under vacuum to a small volume, poured into ice water and the precipitate was filtered and recrystallized from acetone-hexane, thus affording the acetate of 16-methyl-$\Delta^{15}$-allopregnene-3β,17α-diol-11,20-dione, identical with that obtained in Example 2.

Example 16

A solution of 1 g. of 16$\beta$-methyl-16$\alpha$,17$\alpha$-oxido-allopregnan-3$\beta$-ol-11,20-dione-acetate in 20 cc. of acetone was treated with 5 cc. of a 57% aqueous solution of hydroiodic acid and the mixture allowed to stand at room temperature for 30 minutes, diluted with ice water and the precipitate collected by filtration. Recrystallization from acetone-hexane gave 16$\alpha$-methyl-$\Delta^{15}$-pregnen-3$\beta$,17$\alpha$-diol-11,20-dione 3-acetate.

The above compound was hydrogenated as described in Example 1, affording 16$\alpha$-methyl-allopregnan-3$\beta$,17$\alpha$-diol-11,20-dione-acetate identical to that obtained in Example 2.

Example 17

A solution of 5 g. of 16$\alpha$-methyl-allopregnane-3$\beta$,17$\alpha$-diol-11,20-dione, obtained as described in Example 1, in 500 cc. of acetone was cooled to 0° C., flushed with nitrogen and slowly treated under stirring with an 8 N solution of chromic acid prepared in dilute sulfuric acid, until the brown-red color of chromium trioxide persisted in the mixture. It was then kept at 0° C. for 10 minutes further, then diluted with ice water and the precipitate was collected by filtration, washed with water, dried and recrystallized from acetone-hexane, thus furnishing 16$\alpha$-methyl-allopregnan-17$\alpha$-ol-3,11,20-trione.

A cooled solution of 4 g. of the above compound in 30 cc. of tetrahydrofurane and 18 cc. of methanol was treated with vigorous stirring with 6 g. of calcium oxide and then with 6 g. of iodine. The mixture was stirred at room temperature until the color of the solution turned pale yellow, then poured into ice water containing 16 cc. of acetic acid and 2 g. of sodium thiosulfate and stirred for 15 minutes; most of the liquid was decanted and the precipitate was collected by filtration, washed with water and dried under vacuum. There was thus obtained the crude 16$\alpha$-methyl-21-iodo-allopregnan-17$\alpha$-ol-3,11,20-trione.

The above substance was mixed with 100 cc. of anhydrous acetone and 12 g. of recently fused potassium acetate and refluxed for 20 hours. The mixture was concentrated to a small volume under reduced pressure, diluted with water and the reaction product was extracted with ether; the extract was washed with water, dried over anhydrous sodium sulfate and the ether was evaporated. Recrystallization of the residue from acetone-hexane afforded the 21-acetate of 16$\alpha$-methyl-allopregnane-17$\alpha$,21-diol-3,11,20-trione.

A suspension of 3 g. of the above compound in 60 cc. of chloroform containing 0.6 cc. of ethanol was saturated with dry hydrogen chloride for 15 minutes under strong stirring; there was then added under stirring and in the course of 50 minutes 150 cc. of chloroform containing 2.1 molar equivalents of bromine, waiting until decolorization occurred before each addition. The mixture was stirred for 5 minutes further, diluted with 150 cc. of ether and the precipitate was collected by filtration, thus giving the 21-acetate of 2,4-dibromo-allopregnan-17$\alpha$,21-diol-3,11,20-trione in crude form.

The above compound was dissolved in 20 cc. of dimethylacetamide and added to a suspension of 1.5 g. of calcium carbonate in 30 cc. of dimethylacetamide previously heated to boiling; the mixture was refluxed under strong stirring for 15 minutes, cooled, poured into water and acidified with hydrochloric acid. The precipitate was collected; washed with water, dried and recrystallized from acetone-hexane, thus furnishing the 21-acetate of 16$\alpha$-methyl-$\Delta^{1,4}$-pregnadiene-17$\alpha$,21-diol-3,11,20-trione, identical with an authentic sample of the 21-acetate of 16$\alpha$-methyl-prednisone.

Example 18

A mixture of 10 g. of $\Delta^{16}$-pregnen-3$\alpha$-ol-11,20-dione, 300 cc. of anhydrous benzene, 120 cc. of ethylene glycol distilled over sodium hydroxide and 1.6 g. of p-toluenesulfonic acid was refluxed for 12 hours with the use of a water separator. Aqueous sodium bicarbonate solution was added to the cooled mixture, the organic layer was separated, washed with water, dried over anhydrous sodium sulfate and the solvent was evaporated. There was thus obtained the 20 - cycloethyleneketal of $\Delta^{16}$-pregnen-3$\alpha$-ol-11,20-dione, which was used for the next step without further purification. A small amount was purified by chromatography on neutral alumina.

The above compound was dissolved in 100 cc. of tetrahydrofurane and added to a mixture of 3 g. of lithium aluminum hydride and 200 cc. of anhydrous tetrahydrofurane, little by little, with stirring and cooling. The mixture was refluxed for 4 hours, cooled, treated dropwise with acetone to decompose the excess of hydride, then aqueous saturated sodium sulfate solution was added, followed by anhydrous sodium sulfate; the solid was filtered and the solvent was evaporated from the filtrate. There was thus obtained 20-ethylenedioxy-$\Delta^{16}$-pregnene-3$\alpha$,11$\beta$-diol in crude form. This compound was dissolved in 200 cc. of acetone, treated with 1 g. of p-toluenesulfonic acid and a few cc. of water and kept overnight at room temperature; it was then concentrated to a small volume under reduced pressure, diluted with water and the precipitate was collected, washed with water, dried and recrystallized from acetone-hexane, thus giving $\Delta^{16}$-pregnene-3$\alpha$,11$\beta$-diol-20-one.

2 g. of the above compound was dissolved in 50 cc. of an ether solution of diazomethane prepared from 12.5 g. of nitrosomethylurea and the mixture was kept for 24 hours at room temperature. 1.2 cc. of acetic acid was then added, the solution was evaporated to dryness under reduced pressure in a bath at a temperature below 40° C. and the residue was recrystallized from acetone to produce the pyrazoline, which was then decomposed by the thermal treatment described by Wettstein in Helv. Chim. Acta, XXVII, 1803 (1944), by gradually heating to 180° C. in high vacuum. Recrystallization from acetone of the crude product afforded 16-methyl-$\Delta^{16}$-pregnene-3$\alpha$,11$\beta$-diol-20-one.

By treatment of the above compound with an excess of acetic anhydride in pyridine at room temperature, followed by the usual workup, there was obtained the 3 - acetate of 16 - methyl - $\Delta^{16}$ - pregnene - 3$\alpha$,11$\beta$-diol - 20 - one.

In accordance with the reactions heretofore set forth there was prepared 10 g. of the 3-acetate of 16-methyl-$\Delta^{16}$-pregnene-3$\alpha$,11$\beta$-diol-20-one, which was dissolved with slight heating in 125 cc. of dimethylformamide; the mixture was cooled, treated with 4.2 cc. of mesyl chloride and 5 cc. of pyridine and heated at 80° C. for half an hour. Water was added to the cooled mixture, the product was extracted with ethyl acetate, the extract was washed with water, dried over anhydrous sodium sulfate and the solvent was evaporated. Recrystallization of the residue from acetone-hexane yielded the acetate of 16-methyl-$\Delta^{9(11),16}$-pregnadien-3$\alpha$-ol-20-one.

8 g. of the above compound was treated with a solution of 5 g. of potassium hydroxide in a mixture of 100 cc. of acetone and 20 cc. of water, heated on the steam bath for 1 hour, acidified with acetic acid, concentrated to a small volume under reduced pressure, diluted with water and the precipitate was collected, thus giving the free 16-methyl-$\Delta^{9(11),16}$-pregnadien-3$\alpha$-ol-20-one, which was used for the next step without further purification.

The above crude compound was dissolved in 200 cc. of acetic acid and slowly treated under stirring with a solution of 2 g. of chromium trioxide in 40 cc. of 50% acetic acid, taking care that the temperature remained below 15° C. It was then stirred at this temperature for 1 hour more, poured into ice water and the precipitate was collected, washed with water, dried and recrystallized from acetone-hexane, thus affording 16-methyl-$\Delta^{9(11),16}$-pregnadiene-3,20-dione.

A mixture of 7.5 g. of the above compound, 75 cc. of pure dioxane and 12 cc. of 0.4 N perchloric acid was treated in the dark at room temperature with 4.2 g. of N-bromoacetamide which was added with stirring and in the course of 1 hour. The stirring was continued for 1 hour further and the solution was then treated with 10% sodium sulfite solution until the starch-potassium iodide indicator paper no longer turned blue; 500 g. of ice and 120 cc. of chloroform were added and the organic layer was separated, successively washed with sodium bicarbonate solution and water, evaporated under reduced pressure in a bath at a temperature below 25° C. and the residue was triturated with a little cold acetone. There was thus obtained 16-methyl-9α-bromo-Δ$^{16}$-pregnen-11β-ol-3,20-dione.

The above crude compound was dissolved in 20 cc. of dioxane and slowly added to a mixture of 3.2 g. of anhydrous potassium acetate and 40 cc. of absolute ethanol which had been heated nearly to boiling. The mixture was refluxed for 45 minutes, cooled and treated with 50 cc. of ice water under continuous stirring. The precipitate was collected, washed with water and dried, thus yielding 16-methyl-9β,11β-oxido-Δ$^{16}$-pregnene-3,20-dione.

The above crude product was dissolved in 150 cc. of methylene chloride, cooled to 0° C. and the solution was treated with a mixture of 12 g. of anhydrous hydrogen fluoride and 20 cc. of tetrahydrofurane previously cooled in a Dry Ice-acetone bath; the hydrogen fluoride solution had been placed in a polyethylene flask fitted with a magnetic stirrer. The addition was effected little by little, with stirring, over a period of about 20 minutes; the mixture was then stirred at −10° C. for 6 hours more, neutralized by the cautious addition of 5% aqueous sodium bicarbonate solution, the mixture was transferred to a separate funnel and the organic layer was washed with water, dried over anhydrous sodium sulfate and concentrated until abundant precipitation. After cooling the precipitate was collected, redissolved in 40 cc. of hot ethyl acetate, filtered while hot from insoluble material and the filtrate was cooled, thus affording the crystalline 16-methyl-9α-fluoro-Δ$^{16}$-pregnen-11β-ol-3,20-dione.

A solution of 5 g. of the above compound in 65 cc. of chloroform and 155 cc. of methanol was cooled to 0° C. and treated under stirring with 10 cc. of 35% hydrogen peroxide and simultaneously with a solution of 5 g. of sodium hydroxide in 50 cc. of water, dropwise and maintaining the temperature around 0° C. The mixture was then stirred for one hour more at 0° C., then at room temperature for 16 hours, poured into ice water, extracted with chloroform and the combined chloroform extracts were washed with water, dried over anhydrous sodium sulfate and the solvent was evaporated. Recrystallization of the residue from acetone-hexane furnished 16-methyl-9α - fluoro-16α,17α - oxido-pregnan - 11β-ol-3,20-dione.

20 cc. of constant boiling aqueous hydrobromic acid solution was slowly added to a stirred solution of 5 g. of 16β-methyl-9α-fluoro - 16α,17α - oxido-pregnan - 11β-ol-3,20-dione in 100 cc. of pure acetone, maintaining the temperature around 10° C.; the mixture was stirred for 1 hour more at 10° C., diluted with ice water and the precipitate was collected, and recrystallized from acetone-hexane. There was thus obtained 16-methyl-9α-fluoro-Δ$^{15}$-pregnene-11β,17α-diol-3,20-dione.

By applying the hydrogenation method described in Example 1, the latter compound was converted to 16α-methyl-9α-fluoro-pregnane-11β,17α-diol-3,20-dione.

*Example 19*

16 - methyl-Δ$^{9(11),16}$-pregnadiene - 3,20 - dione was prepared as described in Example 18 and then further converted to the 16-methyl-16α,17α-oxido derivative, then to 16-methyl-Δ$^{9(11),15}$-pregnadien-17α-ol-3,20-dione, and finally to 16α-methyl-Δ$^{9(11)}$-pregnen-17α-ol-3,20-dione by the process steps as described in Example 1.

We claim:
1. A process for producing a 16α-methyl-17α-hydroxy-20-keto-pregnane, comprising reacting a 16β-methyl-16α,17α-oxido-20-keto-pregnane with a hydrogen halide in an inert organic solvent selected from the group consisting of acetone, methyl-ethyl ketone and dioxane so as to obtain the corresponding 16-methyl-Δ$^{15}$-17α-hydroxy-20-keto-pregnane, and reacting the latter with hydrogen in the presence of a hydrogenation catalyst selected from the group consisting of palladium and nickel so as to obtain the corresponding 16α-methyl-17α-hydroxy-20-keto-pregnane.

2. The process as described in claim 1, characterized in that the hydrogen halide is employed in the form of a tertiary amine hydrohalide.

3. A process for producing a 16α-methyl-17α-hydroxy-20-keto-pregnane, as described in claim 1, characterized in that a 16β-methyl-16α,17α-oxido-20-keto-pregnane is reacted with a hydrogen halide selected from the group consisting of hydrogen chloride, hydrogen bromide and hydrogen iodide, in acetone, so as to obtain the corresponding 16-methyl-Δ$^{15}$-17α-hydroxy-20-keto-pregnane.

4. In a process for producing a 16α-methyl-17α-hydroxy-20-keto-pregnane, the step of reacting a 16β-methyl-16α,17α-oxido-20-keto-pregnane derivative with aqueous hydrobromic acid in acetone solution at a temperature of from about −10° to room temperature so as to obtain the corresponding 16-methyl-Δ$^{15}$-17α-hydroxy - 20 - keto-pregnane.

5. In a process for producing a 16α-methyl-17α-hydroxy-20-keto-pregnane, the step of reacting a 16β-methyl-16α,17α-oxido-20-keto-pregnane with the hydrohalide of a tertiary amine in an alcoholic solvent at reflux temperature so as to obtain the corresponding 16-methyl-Δ$^{15}$-17α-hydroxy-20-keto-pregnane.

6. A process as described in claim 1, characterized in that the starting compound is selected from the group consisting of the compounds of the formulas:

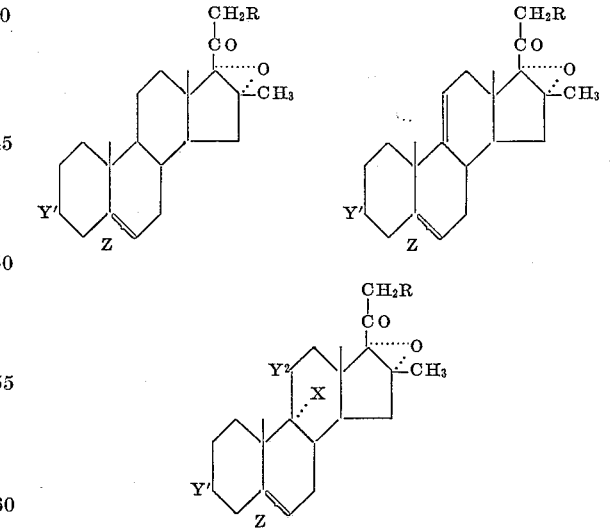

wherein R is selected from the group consisting of hydrogen, hydroxy and acyloxy; X is selected from the group consisting of hydrogen and fluorine; Y′ is selected from the group consisting of =O, α-hydroxy, β-hydroxy, α-acyloxy and β-acyloxy; Y$^2$ is selected from the group consisting of =O, α-hydroxy, β-hydroxy and α-acyloxy; when Y′ is =O, Z is selected from the group consisting of a single bond between C-5 and C-6 with the hydrogen attached to C-5 in α-position and such single bond between C-5 and C-6 with the hydrogen attached to C-5 in β-position; when Y′ represents a member of the above described group other than =O, Z is selected from the group consisting of a double bond between C-5 and C-6, a single bond between C-5 and C-6 with the hydrogen attached to C-5 in α-position and a single bond between C-5 and C-6 with the hydrogen attached to C-5 in the β-posititon; the aforesaid acyloxy and acyl groups being those of a hydrocarbon carboxylic acid having up to 12 carbon atoms.

7. A process as described in claim 6, characterized in that the starting compound is 16β-methyl-16α,17α-oxido-Δ$^{5,9(11)}$-pregnadien-3β-ol-20-one and that the end product is 16α-methyl-Δ$^{5,9(11)}$-pregnadiene-3β,17α-diol-20-one.

8. A process as described in claim 6, characterized in that the starting compound is 16β-methyl-16α,17α-oxido-allopregnan-3β-ol-11,20-dione acetate and that the end product is 16α-methyl-allopregnane - 3β,17α-diol - 11,20-dione 3-acetate.

9. A process as described in claim 6, characterized in that the starting compound is 16β-methyl-16α,17α-oxido-Δ$^5$-pregnen-3β-ol-20-one acetate and that the end product is 16α-methyl-Δ$^5$-pregnene-3β,17α-diol-20-one 3-acetate.

10. A process for producing a16-methyl-17α-hydroxy-20-keto pregnane comprising reacting a Δ$^{16}$-20-keto-pregnane with diazomethane followed by thermal decomposition of the intermediate pyrazoline formed, so as to obtain the corresponding 16-methyl-Δ$^{16}$-20-keto-pregnane, reacting the latter derivative with alkaline hydrogen peroxide so as to obtain the corresponding 16β-methyl-16α,17α-oxido-20-keto-pregnane, reacting the latter epoxide with a hydrogen halide in an inert organic solvent selected from the group consisting of acetone, methyl ethyl ketone and dioxane so as to obtain the corresponding 16-methyl-Δ$^{15}$-17α-hydroxy-20-keto-pregnane, and reacting the latter with hydrogen in the presence of a hydrogenation catalyst so as to obtain the corresponding 16α-methyl-17α-hydroxy-20-keto-pregnane.

11. A compound of the formula

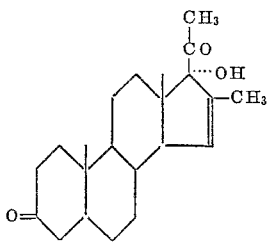

wherein the hydrogen atom at C-5 is selected from the group consisting of the α-position and the β-position.

12. A compound of the formula

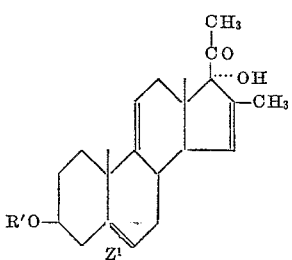

wherein R$^1$ is selected from the group consisting of hydrogen and the acyl radical of a hydrocarbon carboxylic acid of up to 12 carbon atoms, and Z$^1$ is selected from the group consisting of a double bond between C-5 and C-6 and a saturated linkage between C-5 and C-6 with the hydrogen atom at C-5 selected from the group consisting of the α-hydrogen and the β-hydrogen.

13. A compound of the formula

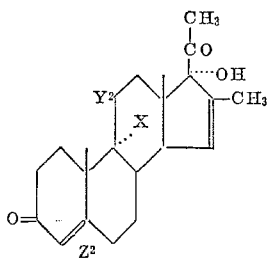

wherein X is selected from the group consisting of hydrogen and fluorine; Y$^2$ is selected from the group consisting of

and =O, and Z$^2$ is a linkage between C-4 and C-5 selected from the group consisting of a double and a saturated linkage with the hydrogen atom at C-5 selected from the group consisting of the α-hydrogen and the β-hydrogen.

14. 16-methyl-Δ$^{5,9(11),15}$-pregnatriene - 3β,17α-diol-20-one.

15. The C-3 hydrocarbon carboxylic acid esters of up to 12 carbon atoms of 16-methyl-Δ$^{5,9(11),15}$-pregnatriene-3β,17α-diol-20-one.

16. 16-methyl-Δ$^{9(11),15}$-allopregnadiene - 3β,17α - diol-20-one.

17. 16-methyl-Δ$^{5,15}$ - pregnadiene - 3β,11α,17α-triol-20-one.

18. 16-methyl-Δ$^{5,15}$-pregnadiene-3β-17α-diol-20-one.

19. 16 - methyl-Δ$^{5,15}$-pregnadiene - 3β,17α-diol - 11,20-dione.

20. 16-methyl-9α - fluoro-Δ$^{15}$-pregnene-11β,17α-diol-3,20-dione.

21. 16-methyl-Δ$^{9(11),15}$-pregnadien-17α-ol-3,20-dione.

22. A compound of the formula:

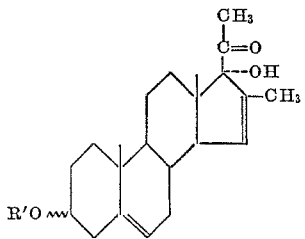

wherein R$^1$ is selected from the group consisting of hydrogen and the acyl radical of a hydrocarbon carboxylic acid of up to 12 carbon atoms.

References Cited by the Examiner
UNITED STATES PATENTS

| | | | |
|---|---|---|---|
| 2,954,386 | 9/1960 | Beyler | 260—397.47 |
| 2,958,702 | 11/1960 | Taub et al. | 260—397.45 |
| 2,984,678 | 5/1961 | Agnello et al. | 260—397.45 |
| 3,004,991 | 10/1961 | Petrow | 260—397.4 |
| 3,053,865 | 9/1962 | Taub | 260—397.45 |
| 3,122,573 | 2/1964 | Nomine | 260—397.4 |

LEWIS GOTTS, *Primary Examiner.*

LESLIE H. GASTON, MORRIS LIEBMAN, IRVING MARCUS, *Examiners.*